Nov. 4, 1947.  J. J. REARDEN  2,430,368
APPARATUS AND METHOD FOR DRAWING AND BROACHING SOCKET WRENCHES
Filed April 12, 1946  4 Sheets-Sheet 2
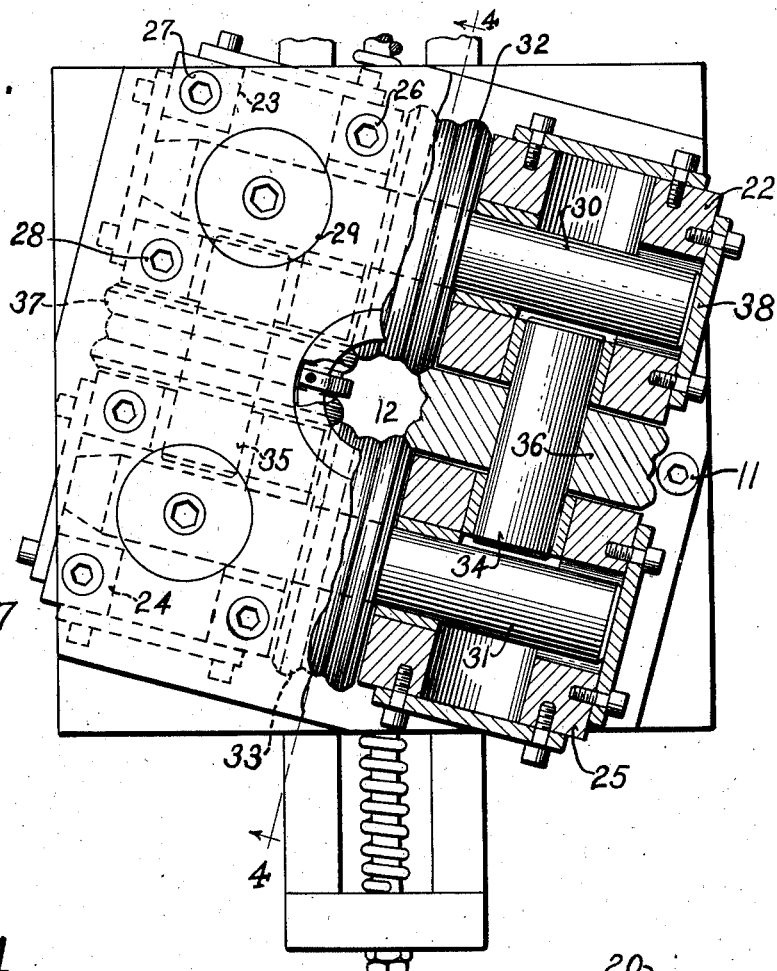
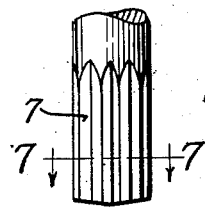
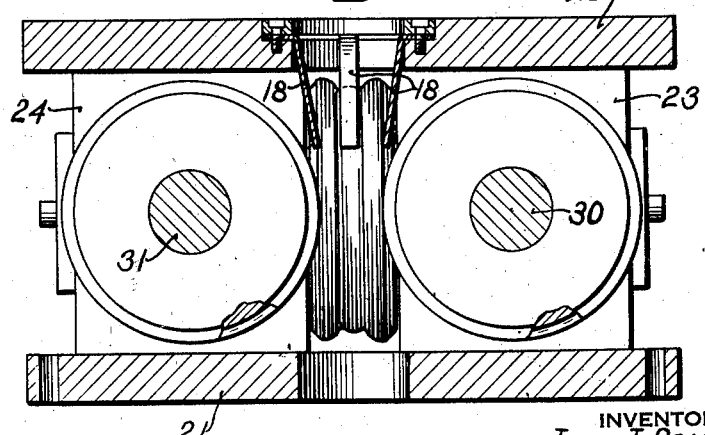
INVENTOR
JOHN J. REARDEN
BY Chapin & Neal
ATTORNEYS

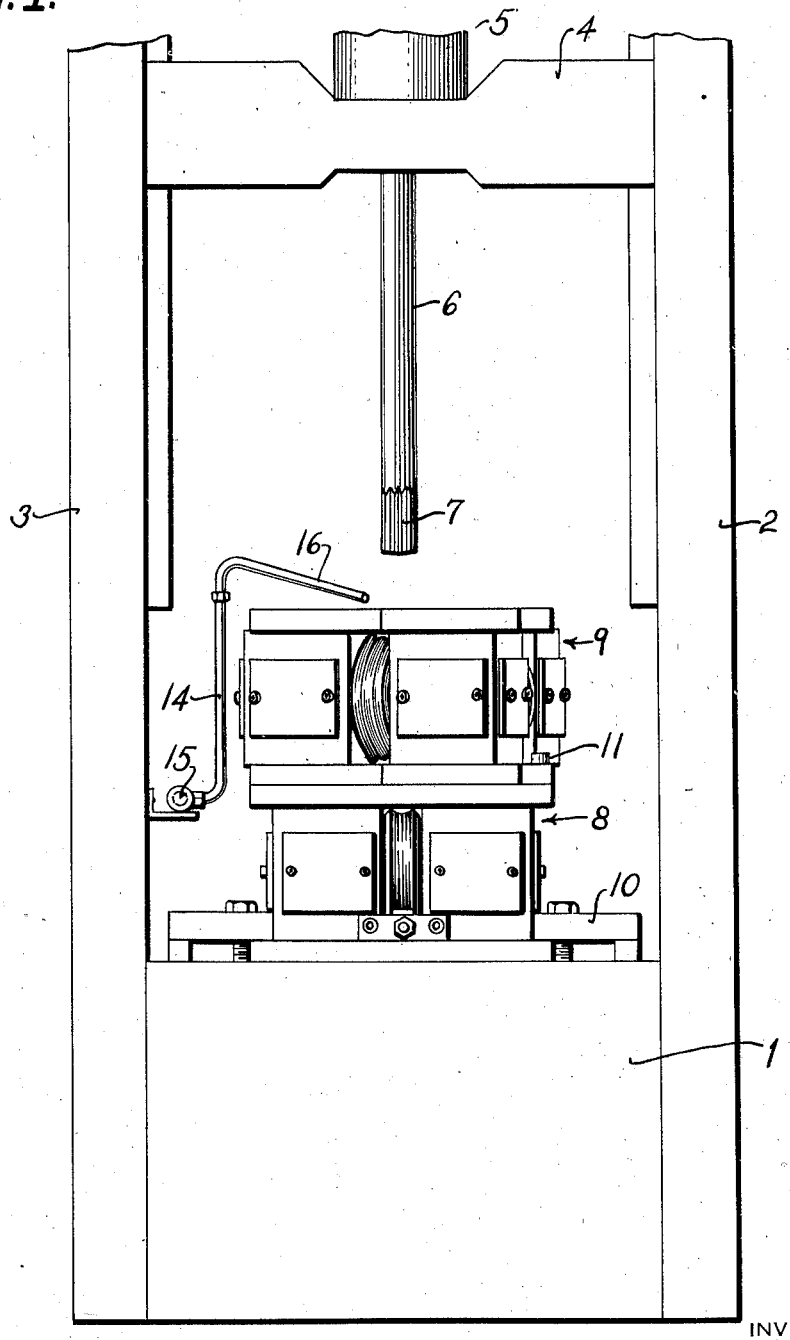

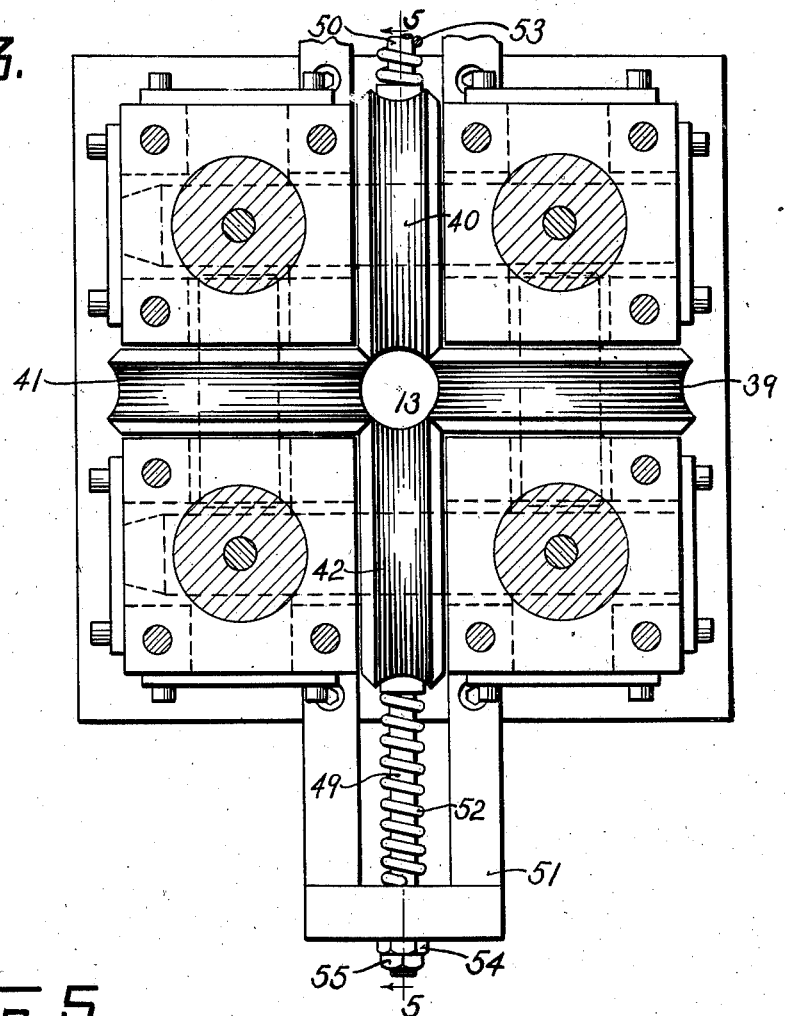
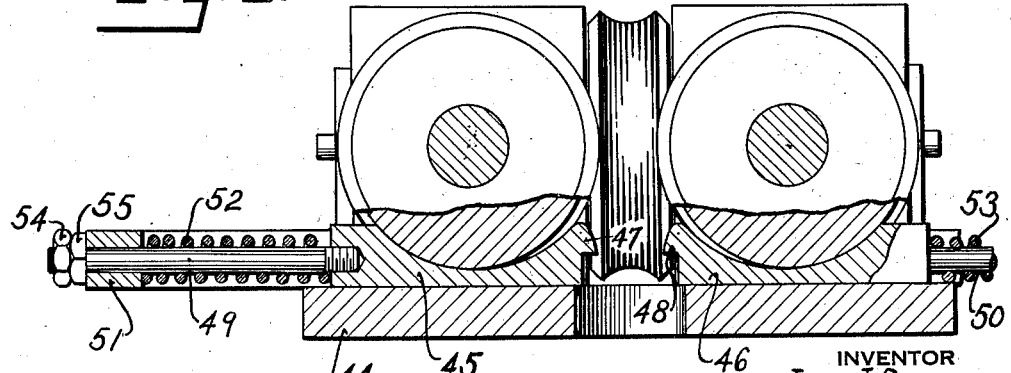

Nov. 4, 1947. J. J. REARDEN 2,430,368
APPARATUS AND METHOD FOR DRAWING AND BROACHING SOCKET WRENCHES
Filed April 12, 1946 4 Sheets-Sheet 4
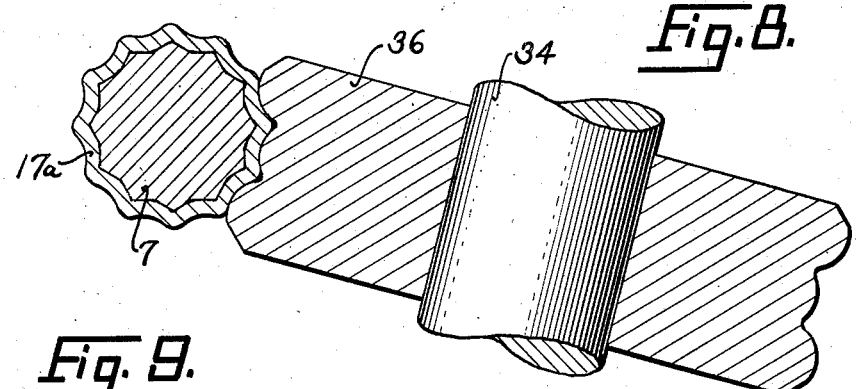
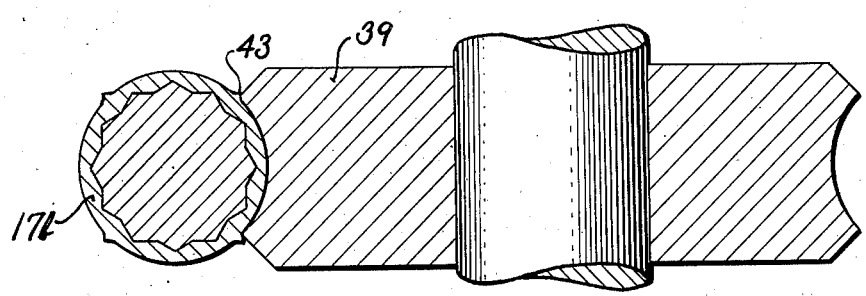
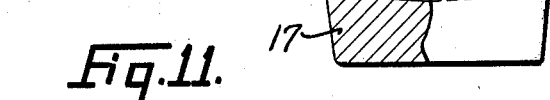
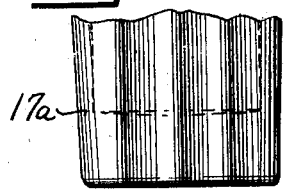
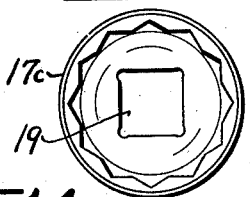
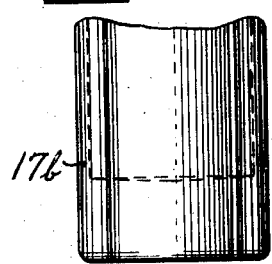
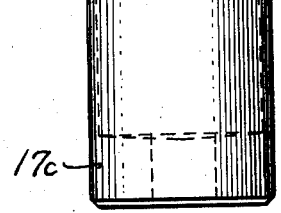
INVENTOR
JOHN J. REARDEN
BY Chapin & Neal
ATTORNEYS Patented Nov. 4, 1947

2,430,368

UNITED STATES PATENT OFFICE 2,430,368

APPARATUS AND METHOD FOR DRAWING
AND BROACHING SOCKET WRENCHES

John J. Rearden, Springfield, Mass., assignor to
Moore Drop Forging Company, Springfield,
Mass., a corporation of Massachusetts Application April 12, 1946, Serial No. 661,715

8 Claims. (Cl. 76—114)

The invention relates to a process and apparatus for making socket wrenches, and the object of the invention is to effect economies in the means and method of such manufacture, and to increase speed of production.

Heretofore, the method of making socket wrenches has been to machine a blank from bar stock usually by a series of screw machine operations, and then shape the socket of the blank by further cutting or broaching operations. My improved method is a radical departure from prior practice, in that my socket wrench is formed substantially complete without the removal of metal by cutting or broaching, thereby saving metal. Further by employing a special drawing and swaging operation I am enabled to cold work the metal from a simple type of forged blank without the necessity of having the metal softened by heat. Starting with a forged blank, my completed product may be fully shaped by the single stroke of a punch or mandrel in forcing the blank through a succession of drawing dies.

The product thus formed by the drawing and swaging may be further trimmed and polished by machine operations for the sake of commercial appearance, but it is essentially completed by the steps mentioned, namely, a forging step in preparing the blank and a combined drawing and swaging step for the completion of the shaped product. The forging of the initial blank does not depart from the art as heretofore practiced in preparing cup shaped slugs or coin blanks for the drawing of shell casings, and need not be further described. My improved method starts with a cup shaped blank thus prepared, which blank has relatively thick walls and a shallow socket. The metal of my blank is of such steel as is usually employed in the making of socket wrenches and my process is essentially a cold working of the metal, the only heat present being that evolved by the working of the apparatus, and this is preferably kept down to reasonable limits by the use of a coolant and lubricant applied to the blank during drawing and swaging of the same.

In the carrying out of my process, the cup shaped blank prepared as aforesaid is forced in a straight axial path through a succession of roll passes which are progressively smaller in diameter than the blank, the forcing through of the blank being accomplished by the stroke of a specially constructed punch or mandrel inserted into the cavity of the blank and under the thrust of a powerful press, such as a hydraulic press having forty tons pressure or thereabout on its ram.

In its broad aspect the aforesaid step has been utilized in the drawing of shell cases from heated billets or forgings, see U. S. Patent 2,278,325, March 31, 1942. However, my process differs therefrom in at least two essential respects, first I employ a mandrel punch which has its lower working end deeply serrated to the exact shape which is ultimately imparted to the internal surface or nut engaging part of the wrench socket. The aforesaid tool not only functions as the punch for forcing the blank through the dies or roll passes, but also serves as a shaping mandrel about which the metal of the socket is swaged and compressed by the action of said roll passes. Secondly I provide the initial roll pass with pressure acting ribs positioned in matching relation with the serrations of said mandrel to start the flow of metal of said blank. The result is that the passage through the first roll pass deforms the cylindrical wall of the socket into a corrugated shape which is not desired in the finished wrench, but which is helpful in starting the rib metal of the socket into the direction it should flow in ultimately conforming to the serrations of the mandrel. The first roll pass having started the flow of socket wall metal in this manner, the succeeding roll pass achieves greater success in completing the compression and drawing of the socket wall metal to the exact conformation of the mandrel so as to have sharp nut engaging corners and smooth flat nut engaging faces in the finished socket of the wrench.

The second roll pass is designed to impart the final shape, viz. a substantially smooth cylindrical surface for the outside of the product and a finished nut engaging socket at the inside thereof.

If desired this drawing and swaging may be accomplished by the progressive action of three or more roll passes for a more gradual reshaping of the metal and to reduce or eliminate any fin formation on the outside cylindrical surface. However, I have successfully carried out my process with only two roll passes as described, the first being what may be called the corrugated roll pass, and the second, a smooth cylindrical roll pass. The fin remnants left by the second roll pass are of such minor character that they may be trimmed off in the operation of putting the finishing touches on the product for its commercial appearance.

A feature of my process resides in the method of staggering the position of the rolls in the two successive roll passes so that the tendency toward a fin formation between adjacent edges of the rolls will not result in an over-pronounced or exaggerated fin. As will be more particularly pointed out in the following detailed description of my apparatus, the position of the rolls of the second roll pass is offset or shifted angularly about the common axial center line, with respect to the position of the rolls in the first roll pass by an amount which is determined by one-half the angular distance (or multiple thereof) between the adjacent serrations of said punch. This is to avoid having an outwardly pressed corrugation of the socket wall formed by the first roll pass, come into coincidence with the crevice between adjacent edges of rolls in the second roll pass. In the particular embodiment illustrated I have shown an apparatus for forming a wrench with a socket of the double-hex or twelve sided type. Each roll pass comprises a set of four rolls positioned radially to the center line axis of the pass at 90° apart and the angular shift between the rolls of the first and second roll pass for such apparatus is 15° or a multiple thereof. If a third roll pass should be employed it likewise should be positioned with an angular shift with respect to the position of the second roll pass so as to cancel fin formation from preceding rolls.

Referring to the drawings which show a preferred embodiment of apparatus for carrying out my invention, Fig. 1 is a view in side elevation of the principal elements of a complete apparatus;

Fig. 2 is a view from above of two die assemblies in their superimposed relation which provide two roll passes in axial alignment, the top plate of the upper die assembly being broken away to show interior parts in section;

Fig. 3 is a top view of the lower die assembly with the top plate thereof removed;

Fig. 4 is a vertical section of the upper die assembly along line 44 of Fig. 2, looking in the direction of the arrow;

Fig. 5 is a vertical section of the lower die assembly along line 5—5 of Fig. 3, with lower parts thereof broken away;

Fig. 6 is a detail elevational view on the same scale as Fig. 2 of the lower working end of the punch;

Fig. 7 is a cross section of the same along line 7—7 of Fig. 6;

Fig. 8 is a detail sectional view in full size scale to illustrate diagrammatically the action of the corrugated rolls upon the blank in the first roll pass;

Fig. 9 is a similar view illustrating the action of the smooth rolls and by its position shows the angular shift between the adjacent sets of rolls;

Fig. 10 is a full size view of a blank partly in section;

Fig. 11 is a side view of the same blank after its passage through the first roll pass, a transverse section of the blank appearing in Fig. 10;

Fig. 12 is a side view of the same blank after its passage through the second roll pass and in substantially completed form, the transverse section of this blank appearing in Fig. 9;

Fig. 13 is a view looking into the socket; and

Fig. 14 is a side view of the completely finished socket wrench, with a square hole machined through its bottom and after the rough surfaces of the blank in Fig. 12 have been finished off.

In carrying out my invention, I employ a suitable press which may be of the hydraulic type with a ram pressure of 40 tons or more. Such a press is shown in outline in Fig. 1 with its bed 1, side walls 2 and 3, a reciprocable slide 4, and ram at 5. Carried by the slide 4 for a straight vertical stroke therewith is a punch 6 having a lower working end 7. As shown more clearly in Figs. 6 and 7 the working end 7 of the punch is deeply and sharply serrated, and serves as a mandrel of the form which is to be ultimately imparted to the inside surface of the wrench socket.

Rigidly secured against displacement upon the bed 1 of the press are a pair of superimposed die assemblies indicated generally at 8 and 9. The lower die assembly 8 is held fast to the bed 1 by a clamping bracket 10, and the upper die assembly is securely fastened to the lower die assembly by bolts such as 11, in Figs. 1 and 2. Each of these die assemblies 8 and 9 is constructed to provide a die throat or roll pass therethrough, the roll pass for the upper die being indicated at 12 on Fig. 2 and the roll pass for the lower die at 13 in Fig. 3. These two die assemblies 8 and 9 are mounted one above the other, with said roll passes in axial alignment with the reciprocable stroke of punch 6 and it will be understood that said punch will have such stroke as to carry its working end 7 down through both of said roll passes and return to a position somewhat as indicated in Fig. 1. The apparatus is also preferably provided with a supply pipe 14 for a liquid coolant or lubricant and communicating with a suitable source of pressure supply of said coolant through pipe 15. A suitably swiveled dispensing nozzle 16 may be mounted as shown to direct the flow of liquid coolant into the roll passes during the working of the apparatus.

The procedure followed in carrying out my method consists in starting with a blank or slug 17, such as shown in Fig. 10 which is positioned at the entrance to the roll pass 12 of the upper die assembly. The blank 17 is of the usual type of steel used for socket wrenches and may be produced by a preliminary forging operation in the usual manner. It is preferably formed as shown in a cup-shape with relatively thin walls and shallow socket. To facilitate the location of said blank 17 in axial alignment with the punch 6, a holding device is provided adjacent the roll pass 12 comprising a plurality of spring fingers 18 (see Fig. 4). The blank is placed in engagement with said spring fingers 18 with its socket facing uppermost so as to receive the punch end 7 fitted therein. Then the punch 6 is lowered under the ram pressure to force said blank 17 in one continuous stroke downwardly and successively through the roll passes 12 and 13. The diameter of the roll pass 12 is slightly smaller than the outside dimensions of blank 17 and the diameter of the lower roll pass 13 is slightly smaller than that of roll pass 12, so that the blank 17 in successively passing through said roll passes is subjected to a progressive drawing and swaging action, which reduces the thickness of its walls and also elongates it. The form of the blank after it has passed through the first roll pass will appear as at 17a, shown in Fig. 11, and in cross section in Fig. 8. The form of the blank after its passage through the second roll pass 13 will appear as at 17b, shown in Fig. 12, and in section in Fig. 9. In this last form of the blank 17b, it is completely shaped into a wrench socket with its inside surface sharply defined for nut engaging purposes and with its outward surface substantially cylindrical. The finishing of the blank thereafter consists in smoothing its outer cylindrical surface, trimming the top edge thereof, machining a square hole 19 in the bottom, as shown in Fig. 13, and in heat treating the same for the desired toughness and hardness of the commercial product.

As shown in Fig. 2, the upper roll pass 12 is defined by the corrugated surfaces of rolls positioned around the center line of said pass. The walls of blank 17 in its passage through this corrugated roll pass 12 are deformed into a corrugated shape, as indicated more clearly in Fig. 8. The action of the corrugated surfaces in this first roll pass is to start the flow of wall metal of the blank into the direction in which it should go for conforming to the serrations of the punch or mandrel 7. In its passage through the second roll pass 13 the wall of the blank is acted on by roll surfaces which are smoothly concave as shown in Fig. 9, and while the pressure therefrom is continued to further draw and swage the blank, the smooth surface of these rolls in the second roll pass operates to impart a smooth cylindrical surface to the outside of the blank and at the same time completely press the inner wall of said blank into its final conformation with the outer surface of the mandrel 7. As before stated, the blank is fully shaped and substantially completed after its passage through the second roll pass and only needs to be trimmed and finished for presentation in its commercial form, as shown at 17c in Fig. 14.

The rolls which provide the roll passes above described and the mounting of the same in their respective die assemblies are substantially alike except for diameter and shape of surfaces. This construction will be more particularly described in connection with Figs. 2 and 4. As therein shown, the upper die assembly comprises a top rectangular plate 20 and bottom rectangular plate 21 firmly clamped together upon four trunnion blocks of approximately cubical shape, one at each of the four corners of said plates, said blocks being indicated at 22, 23, 24, and 25. Screw bolts such as indicated at 26, 27 and 28, through both the top and bottom plates serve to fasten the intervening blocks such as 23 in place. In addition to said fastening bolts each block is held against displacement relative to its upper and lower plate by a large circular dowel plug such as indicated at 29 in Fig. 2. Aligned bearings are formed in the adjacent blocks 22 and 23 for the reception of a relatively long trunnion shaft 30, and aligned bearings in the adjacent blocks 24 and 25 are similarly formed for the reception of a similar long trunnion shaft 31. A roll with a corrugated surface 32 is rotatably mounted upon shaft 30 and a similar roll 33 is rotatably mounted on the shaft 31. Aligned bearings in the adjacent sides of blocks 22 and 25 are provided for the reception of a relatively short trunnion shaft 34 and a similar short shaft 35 is mounted in bearings formed in the adjacent sides of the blocks 23 and 24. Corrugated surface rolls 36 and 37 similar to rolls 32 and 33 are mounted for rotation upon their respective shafts 34 and 35. Cover plates such as 38 are bolted to the outside of the several blocks to close the bearing opening therethrough as indicated in Fig. 2. Each of the rolls 32, 33, 36 and 37 are of identical size and shape and are mounted radially about the center line of the roll pass 12 at 90° apart with their inner corrugated surfaces adjacent one another so as to define thereby the said roll pass 12. In a similar manner as above described, a group of four rolls 39, 40, 41 and 42 are mounted in the lower die assembly 8, each of these rolls having smooth concave surfaces in adjacent relation for defining the cylindrical roll pass 13, as shown in Fig. 3. The roll pass 13 as heretofore mentioned is slightly less in diameter than the corrugated roll pass 12.

In the apparatus illustrated I have shown a group of four rolls for defining each roll pass and it will be appreciated that each separate group of rolls in compressing the metal of the blank in its passage therethrough will tend to produce a flash of metal or fin at each crevice between the adjacent edges of each pair of rolls. An example of such a fin is indicated at 43 in Fig. 9. In order to minimize this fin formation, it is desirable to position the rolls of the first roll pass 12 in angular shifted relation with respect to the rolls of the second roll pass. In other words, the planes of rotation of each set of rolls should be angularly displaced with respect to one another so that the crevices between the adjacent edges of each successive pair of rolls will not be in the same vertical line. This angular shift is shown by the relative position of the die assemblies in Figs. 2 and 3 and the separate rolls 36 and 39 in the sectional views of Figs. 8 and 9. By this arrangement the formation of any fins by the first set of rolls will be cancelled out by the action of the next set of rolls, although, a slight fin such as 43 may be left by the last set of rolls through which the blank passes. The amount of angular displacement between the planes of rotation of the first set of rolls and the second set of rolls in the illustrated apparatus is 15°, since this is half the radius angle between adjacent corrugations of the blank 17 in Fig. 8 or serrations of the tool end 7. In this way, any ridge of the corrugated blank 17a will be out of register with any crevice between edges of rolls in roll pass 13.

In the last or second die assembly, of the apparatus here shown, means are provided for stripping the blank from the end of the punch after it has passed completely through the second roll pass and returns upwardly for the next stroke. As shown in Fig. 5, a pair of diametrically spring pressed opposed dogs 45 and 46 are slidably mounted on bottom plate 44 of die assembly 8 just beneath a pair of opposed rollers, such as 39 and 41. These dogs 45 and 46 have inner hooked ends 47 and 48 which are adapted to engage the rim of a completed blank after it has passed below the same in the downward stroke of punch 6. Upon the upward stroke of said punch the completed blank will be thereby stripped off the same in an obvious manner. The dogs 45 and 46 are fixed to respective guide rods 49 and 50, and these guide rods slide in brackets such as 51 for rod 49 at the left of Fig. 5. The bracket 51 is fixed to the lower plate 44 of the die assembly 8 and a coiled spring 52 is interposed between the end of said bracket 51 and the dog 45 tending to keep dog 45 to its inward position as shown in Fig. 5. Dog 46 has a spring 53 acting in a similar manner to keep said dog 46 in its inward position. The outer end of each guide rod 49 and 50 is provided with stop and lock nuts such as shown at 54, 55 for rod 49 to limit the inward position of the respective dogs 45 and 46, said inward position being such as to avoid undue friction between the dogs and the concave surfaces of rolls 39 and 41 under which the said dogs are located.

While in the present embodiment of the apparatus I have shown only two roll passes for swaging, drawing and shaping the blank, it is to be understood that three more roll passes may be used if desired so as to act progressively in the gradual drawing and shaping operation. In all cases the first roll pass should have the corrugated shape as herein shown. The following roll passes may be circular in shape and of gradually reduced diameter. The relative angular position of each succeeding roll pass should be such as to cancel out fins formed by the next preceding roll pass, and the final roll pass should be provided with blank stripping means such as herein illustrated.

What I claim is:

1. The method of forming socket wrenches by cold working of a cup shaped blank having relatively thick walls and a shallow socket which consists in, inserting a punch having a serrated outer surface into the socket of said blank and forcing the blank through successive roll passes of progressively smaller diameter than said blank to effect a succession of drawing actions in reducing the wall thickness and in elongating the socket of said blank, the initial drawing action being effected under the circumscribed pressure of corrugated roll surfaces defining said first roll pass to thereby impart a corrugated shape to said socket wall and start the flow of socket wall metal into the serrations of the inserted punch, the succeeding drawing action being effected under the circumscribed pressure of smooth concave roll surfaces defining said successive roll pass to thereby impart a cylindrical outer surface on said socket wall and to shape the inner surface of said socket wall to the serrated form of said inserted punch.

2. The method of forming socket wrenches by cold working of a cup shaped blank having relatively thick walls and a shallow socket which consists in, inserting a punch having a serrated outer surface into the socket of said blank and forcing the blank through successive roll passes of progressively smaller diameter than said blank to effect a succession of drawing actions in reducing the wall thickness and in elongating the socket of said blank, the initial drawing action being effected under the circumscribed pressure of corrugated roll surfaces defining said first roll pass to thereby impart a corrugated shape to said socket wall and start the flow of socket wall metal into the serrations of the inserted punch, the succeeding drawing action being effected under the circumscribed pressure of smooth concave roll surfaces defining said successive roll pass to thereby impart a cylindrical outer surface on said socket wall and to shape the inner surface of said socket wall to the serrated form of said inserted punch, and after its passage through said final roll pass, stripping the blank from said punch.

3. The method of forming socket wrenches by cold working of a cup shaped blank having relatively thick walls and a shallow socket which consists in, inserting a punch having a serrated outer surface into the socket of said blank and by a single stroke of said punch, forcing the blank through two successive roll passes of progressively smaller diameter than said blank to effect a succession of drawing actions in reducing the wall thickness and in elongating the socket of said blank, the first drawing action being effected under the circumscribed pressure of corrugated roll surfaces defining said first roll pass to thereby impart a corrugated shape to said socket wall and start the flow of socket wall metal into the serrations of the inserted punch, the second and final drawing action being effected under the circumscribed pressure of smooth concave roll surfaces defining said second roll pass to thereby impart a cylindrical outer surface on said socket wall and to completely shape the inner surface of said socket wall to the serrated form of said inserted punch.

4. In apparatus for forming socket wrenches from blanks in combination, a power press comprising its bed and relatively reciprocable slide, a punch carried by said slide having a working end serrated to the shape ultimately imparted to the socket of said wrench, a plurality of die assemblies mounted in axial alignment on said bed, each providing a roll pass progressively smaller in diameter than said blank, whereby an advancing stroke of said punch may force a blank successively through said roll passes for drawing and shaping said blank, each of said die assemblies comprising a set of independently mounted rolls having concave surfaces arranged in juxtaposition to define a circumscribed roll pass, the roll surfaces of said initial pass having corrugations in complementary relation to the serrations of said punch so as to impart a corrugated shape to said socket wall, and the roll surfaces of the succeeding pass being smooth to impart a cylindrical outer surface to said socket wall.

5. In apparatus for forming socket wrenches from blanks in combination, a power press comprising its bed and relatively reciprocable slide, a punch carried by said slide having a working end serrated to the shape ultimately imparted to the socket of said wrench, a plurality of die assemblies mounted in axial alignment on said bed, each providing a roll pass progressively smaller in diameter than said blank, whereby an advancing stroke of said punch may force a blank successively through said roll passes for drawing and shaping said blank, each of said die assemblies comprising a set of independently mounted rolls having concave surfaces arranged in juxtaposition to define a circumscribed roll pass, the roll surfaces of said initial pass having corrugations in complementary relation to the serrations of said punch so as to impart a corrugated shape to said socket wall, and the roll surfaces of the succeeding pass being smooth to impart a cylindrical outer surface to said socket wall, and stripping means mounted at the discharge side of the final roll pass acting to strip the blank from the punch upon its return stroke.

6. In apparatus for forming socket wrenches from blanks in combination, a power press comprising its bed and relatively reciprocable slide, a punch carried by said slide having a working end serrated to the shape ultimately imparted to the socket of said wrench, a plurality of die assemblies mounted in axial alignment on said bed, each providing a roll pass progressively smaller in diameter than said blank, whereby an advancing stroke of said punch may force a blank successively through said roll passes for drawing and shaping said blank, each of said die assemblies comprising a set of independently mounted rolls having concave surfaces arranged in juxtaposition to define a circumscribed roll pass, the roll surfaces of said initial pass having corrugations in complementary relation to the serrations of said punch so as to impart a corrugated shape to said socket wall, and the roll surfaces of the succeeding pass being smooth to impart a cylindrical outer surface to said socket wall, and a set of spring fingers for releasably supporting a blank at the entrance to said initial roll pass.

7. In apparatus for forming socket wrenches from blanks in combination, a power press comprising its bed and relatively reciprocable slide, a punch carried by said slide having a working end serrated to the shape ultimately imparted to the socket of said wrench, a plurality of die assemblies mounted in axial alignment on said bed, each providing a roll pass progressively smaller in diameter than said blank, whereby an advancing stroke of said punch may force a blank successively through said roll passes for drawing and shaping said blank, each of said die assemblies comprising a set of independently mounted rolls having concave surfaces arranged in juxtaposition to define a circumscribed roll pass, the roll surfaces of said initial pass having corrugations in complementary relation to the serrations of said punch so as to impart a corrugated shape to said socket wall, and the roll surfaces of the succeeding pass being smooth to impart a cylindrical outer surface to said socket wall, stripping means mounted at the discharge side of the final roll pass acting to strip the blank from the punch upon its return stroke, and a set of spring fingers for releasably supporting a blank at the entrance to said initial roll pass.

8. In apparatus for forming socket wrenches from blanks in combination, a power press comprising its bed and relatively reciprocable slide, a punch carried by said slide having a working end serrated to the shape ultimately imparted to the socket of said wrench, a plurality of die assemblies mounted in axial alignment on said bed, each providing a roll pass progressively smaller in diameter than said blank, whereby an advancing stroke of said punch may force a blank successively through said roll passes for drawing and shaping said blank, each of said die assemblies comprising a set of independently mounted rolls having concave surfaces arranged in juxtaposition to define a circumscribed roll pass, the roll surfaces of said initial pass having corrugations in complementary relation to the serrations of said punch so as to impart a corrugated shape to said socket wall, and the roll surfaces of the succeeding pass being smooth to impart a cylindrical outer surface to said socket wall, the successively acting die assemblies being mounted in staggered angular relation about the common axial center line of said roll passes whereby the rolls of said second roll pass are angularly displaced with respect to the rolls of the first roll pass by an amount determined by one-half the angular distance between adjacent serrations of said punch.

JOHN J. REARDEN.

REFERENCES CITED

The following references are of record in the file of this patent:

UNITED STATES PATENTS

| Number | Name | Date |
| --- | --- | --- |
| 1,513,565 | Somersall | Oct. 28, 1924 |
| 1,152,984 | Sherbondy | Sept. 7, 1915 |
| 2,207,245 | Dvorak | July 9, 1940 |
| 832,083 | Roth | Oct. 2, 1906 |